(12) United States Patent
Avary et al.

(10) Patent No.: US 11,687,947 B2
(45) Date of Patent: *Jun. 27, 2023

(54) AUTOMATIC CONNECTED VEHICLE ENROLLMENT

(71) Applicant: Aeris Communications, Inc., San Jose, CA (US)

(72) Inventors: Michelle Lynne Avary, Menlo Park, CA (US); Henry Plager, Mountain View, CA (US)

(73) Assignee: Aeris Communications, Inc., San Jose, CA (US)

( * ) Notice: Subject to any disclaimer, the term of this patent is extended or adjusted under 35 U.S.C. 154(b) by 85 days.

This patent is subject to a terminal disclaimer.

(21) Appl. No.: 16/986,920

(22) Filed: Aug. 6, 2020

(65) Prior Publication Data

US 2020/0364726 A1  Nov. 19, 2020

Related U.S. Application Data

(63) Continuation-in-part of application No. 14/927,221, filed on Oct. 29, 2015, now abandoned.

(60) Provisional application No. 62/073,667, filed on Oct. 31, 2014.

(51) Int. Cl.
*G06Q 30/00* (2023.01)
*G06Q 30/018* (2023.01)

(52) U.S. Cl.
CPC .................................. *G06Q 30/018* (2013.01)

(58) Field of Classification Search
CPC .... G06Q 30/0185; H04W 4/70; H04W 12/02; H04W 60/06; H04W 60/00; H04L 67/02; H04L 67/04; H04L 63/10; H04L 67/306; H04L 63/08
See application file for complete search history.

(56) References Cited

U.S. PATENT DOCUMENTS

| 5,635,693 A | 6/1997 | Benson et al. |
| 6,807,667 B1 | 10/2004 | Bar |
| 6,868,389 B1 | 3/2005 | Wilkins et al. |

(Continued)

FOREIGN PATENT DOCUMENTS

| CN | 100531066 C | * | 8/2009 | |
| CN | 101828200 A | * | 9/2010 | ....... G06Q 10/06393 |

(Continued)

OTHER PUBLICATIONS

Jerome Swartz, "Security Systems for a Mobile World" 2003, Technology in Society, vol. 25, pp. 5-25. (Year: 2003).*

(Continued)

*Primary Examiner* — Tan D Nguyen
(74) *Attorney, Agent, or Firm* — Shih IP Law Group, PLLC (57) ABSTRACT

The present invention is directed toward an automated automotive enrollment system and method for automatically enrolling a vehicle whereafter the vehicle may be registered with one or more subscription-based events based on customer and vehicle data associations. In one more embodiments, a computer implemented method provides for identifying customer and vehicle information in conjunction with registration and subscription event opportunities, and provides for activating an associated subscription set in response to the specific customer and vehicle information so that the vehicle is suitably enrolled.

20 Claims, 6 Drawing Sheets

(56) References Cited

U.S. PATENT DOCUMENTS

| | | |
|---|---|---|
| 7,126,457 B1 | 10/2006 | van Schalkwyk Fourie et al. |
| 7,225,229 B1 | 5/2007 | Abbott |
| 7,251,473 B2 | 7/2007 | Alrabady et al. |
| 8,267,317 B1 | 9/2012 | Gulli |
| 8,588,991 B1 | 11/2013 | Forbes, Jr. |
| 8,868,458 B1 | 10/2014 | Starbuck et al. |
| 9,178,979 B1 | 11/2015 | Khalil |
| 2002/0152238 A1 | 10/2002 | Hayes |
| 2002/0186144 A1 | 12/2002 | Meunier |
| 2003/0115489 A1 | 6/2003 | Kanaishi |
| 2003/0200406 A1 | 10/2003 | Kouno |
| 2004/0177032 A1 | 9/2004 | Bradley |
| 2005/0072842 A1 | 4/2005 | Yamagiwa |
| 2005/0132024 A1 | 6/2005 | Habaguchi et al. |
| 2005/0139664 A1* | 6/2005 | Yamagiwa ............ G06Q 30/02 235/385 |
| 2005/0283284 A1 | 12/2005 | Grenier et al. |
| 2006/0003762 A1 | 1/2006 | Sumcad et al. |
| 2006/0004488 A1 | 1/2006 | Sugiyama et al. |
| 2007/0214063 A1 | 9/2007 | Kahlon |
| 2007/0237610 A1 | 10/2007 | Uribe |
| 2007/0282738 A1 | 12/2007 | Highbloom |
| 2008/0203145 A1 | 8/2008 | Martins |
| 2008/0228346 A1* | 9/2008 | Lucas ................. G06Q 10/087 701/31.4 |
| 2008/0231446 A1 | 9/2008 | Cresto |
| 2009/0048942 A1 | 2/2009 | Bouwens et al. |
| 2009/0089069 A1 | 4/2009 | McKibbon |
| 2009/0112394 A1 | 4/2009 | Lepejian et al. |
| 2009/0172077 A1 | 7/2009 | Roxburgh |
| 2009/0177336 A1 | 7/2009 | McClellan et al. |
| 2009/0195370 A1 | 8/2009 | Huffman et al. |
| 2009/0296146 A1 | 12/2009 | Nakawaki |
| 2009/0309709 A1 | 12/2009 | Bevacqua et al. |
| 2010/0076801 A1 | 3/2010 | Ku |
| 2010/0094482 A1 | 4/2010 | Schofield et al. |
| 2010/0157347 A1 | 6/2010 | Yoshimura |
| 2010/0192212 A1* | 7/2010 | Raleigh ................. H04W 12/08 726/7 |
| 2010/0266280 A1 | 10/2010 | Yamashita |
| 2011/0119614 A1 | 5/2011 | Powell et al. |
| 2011/0161227 A1 | 6/2011 | Santo |
| 2011/0166897 A1 | 7/2011 | Beckman |
| 2012/0039212 A1 | 2/2012 | Kaliyaperumal et al. |
| 2012/0076129 A1 | 3/2012 | Free |
| 2012/0079272 A1 | 3/2012 | Tolle |
| 2012/0140764 A1 | 6/2012 | Sheth |
| 2012/0142367 A1 | 6/2012 | Przybylski |
| 2012/0252407 A1 | 10/2012 | Poltorak |
| 2013/0006916 A1 | 1/2013 | McBride et al. |
| 2013/0227650 A1 | 8/2013 | Miyake |
| 2013/0254469 A1 | 9/2013 | Miyake et al. |
| 2013/0254519 A1 | 9/2013 | Benoit |
| 2013/0297456 A1 | 11/2013 | Annan et al. |
| 2013/0301829 A1 | 11/2013 | Kawamura |
| 2013/0305323 A1 | 11/2013 | Kleve et al. |
| 2014/0039935 A1 | 2/2014 | Rivera |
| 2014/0114502 A1 | 4/2014 | Hugron et al. |
| 2014/0159866 A1 | 6/2014 | Hwang |
| 2014/0163811 A1 | 6/2014 | Petersen |
| 2014/0200737 A1 | 7/2014 | Lortz et al. |
| 2014/0304784 A1* | 10/2014 | Harrison ............... H04L 63/107 726/5 |
| 2014/0344014 A1 | 11/2014 | MacInnis |
| 2014/0365160 A1 | 12/2014 | Steffen, II |
| 2014/0372245 A1 | 12/2014 | Woodcock |
| 2015/0012445 A1* | 1/2015 | Reid ..................... G06Q 50/30 705/305 |
| 2015/0045983 A1 | 2/2015 | Fraser et al. |
| 2015/0099486 A1 | 4/2015 | Choi |
| 2015/0100506 A1 | 4/2015 | Binion et al. |
| 2015/0154607 A1 | 6/2015 | Frome |
| 2015/0170439 A1* | 6/2015 | Chen ..................... G07C 5/008 701/31.4 |
| 2015/0260529 A1 | 9/2015 | Petersen |
| 2015/0266377 A1 | 9/2015 | Hampiholi et al. |
| 2015/0286994 A1 | 10/2015 | Elder |
| 2015/0334539 A1 | 11/2015 | Cai |
| 2016/0071137 A1 | 3/2016 | Sundaresan |
| 2016/0105314 A1 | 4/2016 | Logue |
| 2016/0127373 A1 | 5/2016 | Avary et al. |
| 2016/0127384 A1 | 5/2016 | Voba |
| 2016/0128016 A1 | 5/2016 | Avary |

FOREIGN PATENT DOCUMENTS

| | | | |
|---|---|---|---|
| WO | 9936297 A1 | 7/1999 | |
| WO | 9965681 A1 | 12/1999 | |
| WO | WO-2011129800 A1 * | 10/2011 | ........... G06Q 30/018 |
| WO | WO-2013011450 A1 * | 1/2013 | ............ H04W 16/14 |
| WO | WO-2013045835 A1 * | 4/2013 | ............ G06Q 10/02 |

OTHER PUBLICATIONS

Ivan Studnia, "Survey on Security Threats and Protection Mechanisms in Embedded Automotive Networks", 2013, IEEE Xplore, pp. 1-2, 2013. (Year: 2013).*

Juan Ibanez, "Integration Challenges of Intelligent Transportation Systems with Connected Vehicle, Cloud Computing, and Internet of Things Technologies", 2015, IEEE Wireless Communications, pp. 122-128. (Year: 2015).*

Mitch Bryson, "Vehicle Model Aided Inertial Navigation for a UAV using Low-cost Sensors", 2006, ARC Centre of Excellence in Autonomous Systems, pp. 1-9. (Year: 2006).*

PCT International Search Report and Written Opinion of the International Searching Authority, dated May 20, 2016, application No. PCT/US2015/58411.

PCT International Search Report and Written Opinion of the International Searching Authority, dated Mar. 2, 2016, application No. PCT/US2015/58347.

PCT International Search Report and Written Opinion of the International Searching Authority, dated Feb. 12, 2016, application No. PCT/US2015/58395.

Final Office Action dated Feb. 21, 2019, pp. 1-21.

* cited by examiner

AUTOMATIC CONNECTED VEHICLE ENROLLMENT

CROSS-REFERENCE TO RELATED APPLICATIONS

This application is a continuation-in-part of U.S. patent application Ser. No. 14/927,221, filed on Oct. 29, 2015, entitled "AUTOMATIC CONNECTED VEHICLE ENROLLMENT" which claims benefit under 35 USC 119 (e) of U.S. Provisional Patent Application No. 62/073,667, filed on Oct. 31, 2014, entitled "AUTOMATIC ENROLLMENT AND METHODS OF USE," and is related to U.S. patent application Ser. No. 15/801,548, filed on Nov. 2, 2017, which is a continuation-in-part of U.S. patent application Ser. No. 14/927,258, filed on Oct. 29, 2015, entitled "AUTOMATIC CONNECTED VEHICLE DEMONSTRATION PROCESS," and U.S. patent application Ser. No. 16/531,323, filed on Aug. 5, 2019, which is a continuation of U.S. patent application Ser. No. 15/895,152, filed on Feb. 13, 2018, which is a continuation-in-part of U.S. patent application Ser. No. 14/927,285, filed on Oct. 29, 2015, entitled "AUTOMATIC CONNECTED VEHICLE SUBSEQUENT OWNER ENROLLMENT PROCESS," all of which are incorporated herein by reference in their entireties.

FIELD OF THE INVENTION

The present invention is directed toward automotive communication services and more particularly to a method and system for providing information related to automated connected vehicle enrollment services.

BACKGROUND

In the transportation industry, various vehicle services are often offered to users of vehicles to enhance their experience with the vehicle. Familiar services now include a variety of software and application-based services, in varied forms, some of which are for free and other which require a subscription or fee-based model. Example of such services include enabling users to connect their smart phones to the vehicles audio system, providing turn-by-turn directions through in-car, on-screen applications, and receiving emergencies services such as unlocking a vehicle's door or the automated reporting of an accident. Many of these services are consumer-focused, in which they enhance the experience of using a vehicle and for some consumers, the availability of these services can be persuasive in making a buying decision for a particular car brand or model.

However, after a purchase, a customer's ability to successfully access the varied services they viewed in a showroom or other sales setting, may be frustrated by difficult interfaces, challenging and non-communicative technologies, and occasionally non-interest by the dealership. Often, as these services are especially desired by the customer, the customer's overall experience with the vehicle may then be negatively affected as well.

Therefore there is a desire to better enroll customers with their vehicle via an authentication-based process while overcoming the traditional security, financial and logistical challenges. The present invention is directed to such a need.

SUMMARY

In one or more embodiments, a computer implemented method is disclosed for on-boarding a vehicle via a vehicle registration network. In one or more embodiments, the method provides for an interactive interface for registering the vehicle, and receiving vehicle and customer information from one or more networked resources. The method also provides for transmitting an initial message to the vehicle to be registered, receiving an initial response to the initial message, and verifying the availability of the vehicle to be registered. Further, the methods provide for verifying a level of services to be activated for the vehicle when registered, and activating the level of services for the registered vehicle.

A further embodiment of the present invention provides for a system for use in an automotive sales network for enrolling a vehicle to one or more subscription-based events. The system, in one or more embodiments includes an interactive interface engine that provides an interactive interface for registering the vehicle and which is capable of receiving and transmitting messages. The system also provides for a communications and verification engine for receiving vehicle and customer information from one or more networked databases and comparing data obtained in the received and transmitted messages with the received vehicle and customer information. Further the system provides for an enrollment engine for enrolling the vehicle as a registered vehicle capable of having one or more activated subscription-based events. Additionally, an activation engine for activating one or more subscription-based events in association with a level of service to be activated for the vehicle when registered is provided for. The system also includes a computer-based secure communication system capable of communications with the one or more networked databases, the vehicle and a sales center, wherein the secure communication is further capable of transmitting and receiving messages to and from the vehicle wirelessly. In one or more embodiments, the system also provides for a reporting engine for generating one or more reports in response to data from one or more of the enrollment engine and the activation engine.

The present invention also provides for a computer program product containing a computer readable medium for use in an automotive sales network having program instructions for: providing an interactive interface for registering the vehicle; receiving vehicle and customer information from one or more networked databases; transmitting an initial message to the vehicle to be registered and receiving an initial response to the initial message; and verifying availability of the vehicle to be registered by comparing the initial response to information in the one or more networked databases. In one or more embodiments, the program instructions also provide for verifying a level of services to be activated for the vehicle when registered, and activating the level of services for the registered vehicle.

DETAILED DESCRIPTION

The present invention is directed toward an automated automotive enrollment system and method for automatically enrolling a vehicle whereafter the vehicle may be registered with one or more subscription-based events based on customer and vehicle data associations.

The following description is presented to enable one of ordinary skill in the art to make and use the invention and is provided in the context of a patent application and its requirements. Various modifications to the embodiments and the generic principles and features described herein will be readily apparent to those skilled in the art. Thus, the present invention is not intended to be limited to the embodiments shown, but is to be accorded the widest scope consistent with the principles and features described herein.

With standardization of enrollment processes at a sales location, using the present invention, it is possible to essentially remove traditional approaches of manually and semi-automatically activating or updating subscription-based services for a purchased vehicle. In the past, traditional methods have required that a sales location first take delivery of vehicle, then introduce the vehicle to the new owner, and seek to align customer information and customer interest in subscribing to the varied subscription services which may be available with the vehicle. This traditional approach requires multiple interactions with a customer requiring excessive time and commitments while inside a dealer location; additionally, often the sales associates may not have a full understanding or time to work with the customer to adequately subscribe the customer to his desired subscription needs. As a result, often the customer does not subscribe to the services which are actually desired and the dealership, subscription provider, and customer each have achieved a less than desired outcome from the overall sales transaction. The present invention overcomes this undesired outcome.

Similarly, using the present invention, the method and systems set forth provide for receipt and delivery of a purchased vehicle at a sales location for a specified customer wherein the desired and/or pre-set subscription services are already activated, customized to the customer, and logged with associated data repositories for authentication, using customer data and vehicle data (also used herein as information) acquired at least in part from the original sales transaction, dealer interactions with the customer, and similar.

The embodiments presented here utilize machine learning and automation so that the process and system can be used for large scale application. The vehicle owner identification may begin with first owner of the vehicle who purchased the vehicle from the dealer, where the vehicle is registered or enrolled as belonging to that owner and is linked to a specific account during enrollment process.

The enrollment process begins once a vehicle is sold to a customer (owner). Upon receipt of a sales record also known as retail delivery reports (RDRs) or other method for linking a vehicle to an owner by the system, information is sent to the vehicle for the owner to complete enrollment. The enrollment process may include verifying VINs via image recognition, SMS/text message to phone on file, and/or in-button pushes. Security information may also be sent via the in-vehicle system and the owner may be asked to verify the number via a text back or logged within a mobile app. Information can also be established via website portal run by the OEM and accessed by enrollment service provider systems. The system is able to set preferences and service sets to the vehicle, including a "Welcome Bob Smith To Your Connected Car" on the screen in the vehicle or an interactive user interface. The system can also send personalized audio messages to the vehicle. All of these verifications, enrollment processes, and personalized messages are generated and acted upon by the system automatically. It can only be done economically at scale with machine learning.

Figure 1:
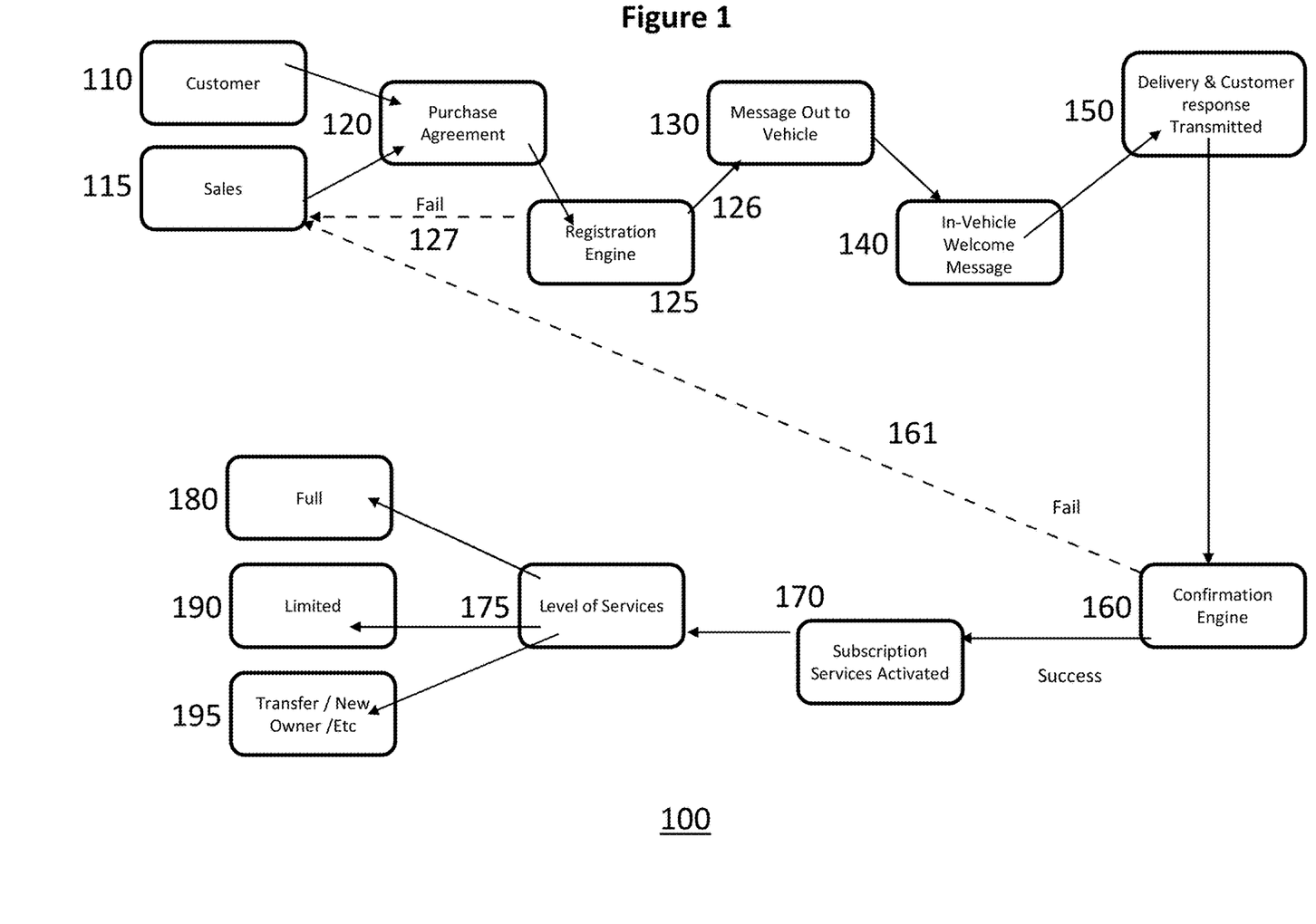
FIG. 1 illustrates a block diagram of the enrollment method in accordance with one or more embodiments of the present invention.

FIG. 1 illustrates a block diagram 100 of the enrollment method in accordance with one or more embodiments of the present invention. From FIG. 1, a customer 110 and a sales associate 115 agree upon terms related to a vehicle and formalize the arrangement via a purchase agreement 120. As part of the purchase agreement 120, information concerning the customer 110 and vehicle is part of the details of the purchase agreement 120.

For instance without limitation, customer information may include name, address, email, cell phone number, social security information, security code, self-identifying key numbers, user name, user password, mobile device information, and other information pertinent to the customer 110 in relation to the sales transaction. Customer information may also include, without limitation, one or more of customer identification information, customer purchasing history, customer ownership information, customer geolocation information, customer subscription information, customer account data, customer contact information, customer marketing information, publicly available information about the customer and private sourced information about the customer, etc.

By example, for instance without limitation, vehicle information may include vehicle identification number (VIN), brand and model, OEM proprietary data related to the vehicle, title information, dealership codes, delivery codes, security information, key codes, and other information pertinent to the vehicle in relation to the sales transaction, etc.

Additionally, the customer 110 and/or vehicle information may include information inclusive of that which is available in retail delivery reports and databases (RDRs), registered vehicles data, registered vehicle owners data, registered vehicle credentials data, registered vehicle identification data, registered vehicle security data, vehicle identification number (VIN) data and history, geolocation and history, depositional information and history, title information and history, insurance information and history, ownership information and history, past history information, subscription information, vehicle geolocation information, publicly available information, and private sourced information, etc. Further the customer 110 and/or vehicle information may include marketing information including web history associated with vehicle manufacturer, prior contacts with vehicle manufacturer and distributor, incentive and rebate utilization, third party information (e.g., Nielsen, IHS and Polk databases) responses to targeted marketing regarding vehicle, email address(es), and registered applications utilized by the customer 110, etc.

Further, for the present invention in one or more embodiments, the purchase transaction or agreement may include an agreement term from the customer 110 which indicates that the customer 110's personal information associated with the transaction may be used. The purchase agreement 120 may also include an agreement term from the customer 110 which agrees to certain subscription-based services as well, where these services may include a variety of electronic, information-based, and/or data-centric services in a variety of forms such as firmware, software, applications, scripts and the like.

Where the customer 110 agrees to the agreement term referenced above, a registration engine 125 compares the information obtained from the purchase agreement 120 with one or more databases for registry verification. The comparison performed by the registration engine 125, in one embodiment, compares the VIN number of the purchased vehicle of the transaction with the VIN number of the automotive database to ensure that the purchased vehicle is available for purchase by the customer 110 and may be registered in accordance with the method of the invention. If the registration engine 125 determines that the VIN number of the customer vehicle under the purchase agreement 120 is available for purchase by the customer 110 and may be registered, the verification process is successful and proceeds at 126. If the registration engine 125 determines that the VIN number of the customer vehicle under the purchase agreement 120 is not available for purchase by the customer 110 and may not be registered, the verification process is unsuccessful and proceeds at 127, returning a failure notice to the sales associate 115 or similar dealer related entity at 115. There are envisioned a number of reasons for possible failure including typographical errors in the sales agreement, inaccurate information in the RDR, pre-sold vehicle not properly accounted for by dealer, etc.

Similarly, at 125, the registration engine 125 (also known as a communications and verification engine) may also consult other databases to determine the availability of a vehicle for registration. Other examples of possible databases, in accordance with one or more embodiments of the present invention, include geolocation databases, dealer inventory databases, public databases, private databases. By further example, the registration engine 125 may compare the geolocation of the vehicle to be registered with the geolocation of vehicle data from a database apart having a secondary VIN-based dataset from the dealership to verify vehicle availability, to determine accuracy of dealership database, and to protect the customer 110 from possible fraud such as VIN swapping, for instance.

At 126, the verification of a successful registration is achieved and specific data may be past to the vehicle to be registered by a registration event at 130. In accordance with one or more embodiments of the present invention, vehicle and customer data is provided to the vehicle's communication system. The vehicle communication system may include cellular and/or wifi enabling communication protocols to enable receipt and transmission of messages to and from an authorized server, local link, and/or remote communication system, such as the registration engine. In one or more embodiments, the registration engine passes information via the registration event to the vehicle at 130 where the information includes successful verification for registration of the vehicle, customer name, customer email, customer cell phone, vehicle VIN number, and desired subscription services to the vehicle. Once received by the vehicle's communication system, the vehicle's communication system generates a 'welcome' message for use by the customer 110 and/or dealer at 140.

The 'welcome' message is generated at 140 in response to the data received by the vehicle's communication system and in accordance with a predetermined format suitable for the dealer, automotive manufacturer, marketing intermediary, leasing company, or other authorized user who has authority to predetermine the format of the messaging. Preferably, the 'welcome' message is generated for visual and/or audio access within the vehicle, as an in-car message which may be displayed in a center console, screen, interactive display platform, or connected customer device such as a smart phone, for instance.

In an embodiment, the in-vehicle 'welcome' message displays introductory information which enables the customer 110 and/or dealer to become familiar with the vehicle and the next steps in the activation process. The in-vehicle message will also solicit an input from the customer 110 or the dealer so as to verify that the vehicle has been or is being delivered as intended. For instance, the in-vehicle message in an embodiment may request that the customer 110 input their email address into the interactive interface in the vehicle or via smart phone and then validate the customer 110's entry. Once validated, by the vehicle communication system sending the input information to an authorized server, such as the registration engine 125 or the confirmation engine 160, for example, to verify the accuracy of the inputted information, the desired subscription services may be upload, initiated and/or registered.

Once the in-vehicle 'welcome' message is received at 140, the customer 110 then responds to the message and inputs a response. The customer 110's inputted response, in an embodiment, indicates acceptance of the terms of using the system, indicates that the vehicle is now or will be delivered as intended to the customer 110, and then sends the inputted response to an authorized server for verification at 150. The transmitted response is then verified by comparing the received input information with that known in one or more databases which are networked elements of the present invention. In the event the inputted response is accurate, the authorized server such as the confirmation engine 160 (also known as an enrollment engine), returns a confirmation successful notice to one or more of the sales department, the customer 110, the customer 110's email or smart phone, and the vehicle's communication system. In the event there is an error in the inputted information or the authorized server is unable to validate the inputted response, a notice of the unsuccessful attempt is sent to one or more of the sales department, the customer 110 and the vehicle's communication system, such as at 161.

Upon successful confirmation by the confirmation engine 160, the vehicle is then readied for activation of the subscription services at 170. The subscription services may be one of a variety of levels of subscriptions services, may be individualized services, or may be standard services which are default services, such as at 175. The subscription services may also be selectable individually by the customer 110 or dealer via the interactive interface though the approach by the present invention is have the subscription services pre-selected for activation so activation of the pre-selected services may be essentially automatic following registration and verification steps.

Once the confirmation engine 160 has affirmed the validity of the inputted response, the subscription services are then activated at 170 in accordance with the level of services chosen during the pre-select at 175. Similarly, the services can also be amended, changed or updated at anytime using the present invention as well. At 175, the level of services may include a full activation set 180 which reflects the suite of services selected during a pre-select, for instance; a limited set 190 of services which may be limited to only safety and security services, for instance; and a secondary owner or transfer vehicle 195 in which the existing data on the vehicle's communication system is wiped clean and then updated with the status of the vehicle. In the latter situation, it is envisioned by the present invention that the transfer vehicle 195 may be a 'trade-in' vehicle to a dealership for example and have no immediate purchaser in which services may or may be uploaded based upon ownership and title issues; similarly, in the event of a subsequent owner of a vehicle, the prior owner's data is wiped clean and then subscription services in accordance with the new owner are updated and activated. In further scenario, it is possible that RDR is delayed where the registration can be verified but the subscription services cannot be fully activated; in such a scenario the present invention provides for registering the vehicle, enabling a limited set of subscription functions and sending a notification to one or more the customer, the dealer and the automotive manufacturer concerning the delayed RDR.

Figure 2A:
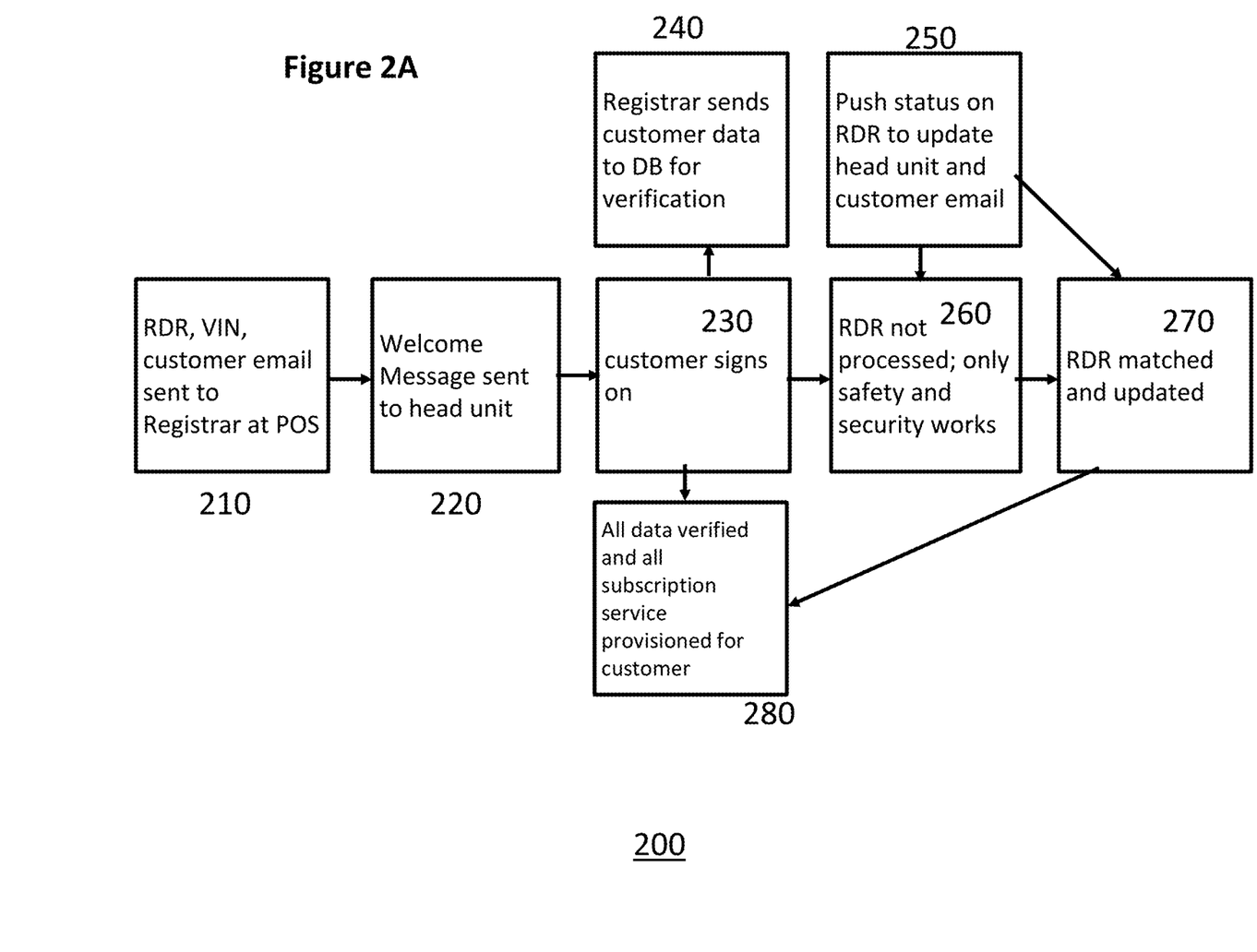
FIG. 2A illustrates a block diagram of the enrollment method in accordance with an embodiment of the present invention.

FIG. 2A illustrates a block diagram 200 of the enrollment method in accordance with an embodiment of the present invention.

At 210, at a minimum the RDR, VIN, customer email information are sent to the registrar from the point of sale location (POS), which may be the dealership via an interactive interface. The registrar may be a registration server, engine or other agent to perform a comparison of the sent data with that available in one or more databases having the requisite information to enable a comparing of accuracy of the received data versus that in the authorized data systems. Once received and assessed for validity, the registrar then sends a 'welcome' message to the head unit of the vehicle at 220.

The 'welcome' message is viewable by the customer and the customer signs on to the head unit at 230 and responds to the inquiry from the received 'welcome' message. The customer's sign on information is then collected and transmitted to the customer database for comparison and validation at 240. Assuming all data is verified as complete and accurate, the validation at 240 is received by the head unit and the subscription service is provisioned for the customer at 280. In the event the data is not verified, a determination of what the issue of non-compliance is performed and where the issue is that the RDR is delayed, only the safety and security services are activated at 260. During a period of non-compliance, the present invention continues a 'push status' update notification to the dealer and/or customer to advise them of the RDR status at 250. Once the RDR is no longer delayed, via the push status, the RDR data is matched and updated at 270, whereafter the data is deemed compliant and the subscription services may be provisioned for the customer at 280.

Figure 2B:
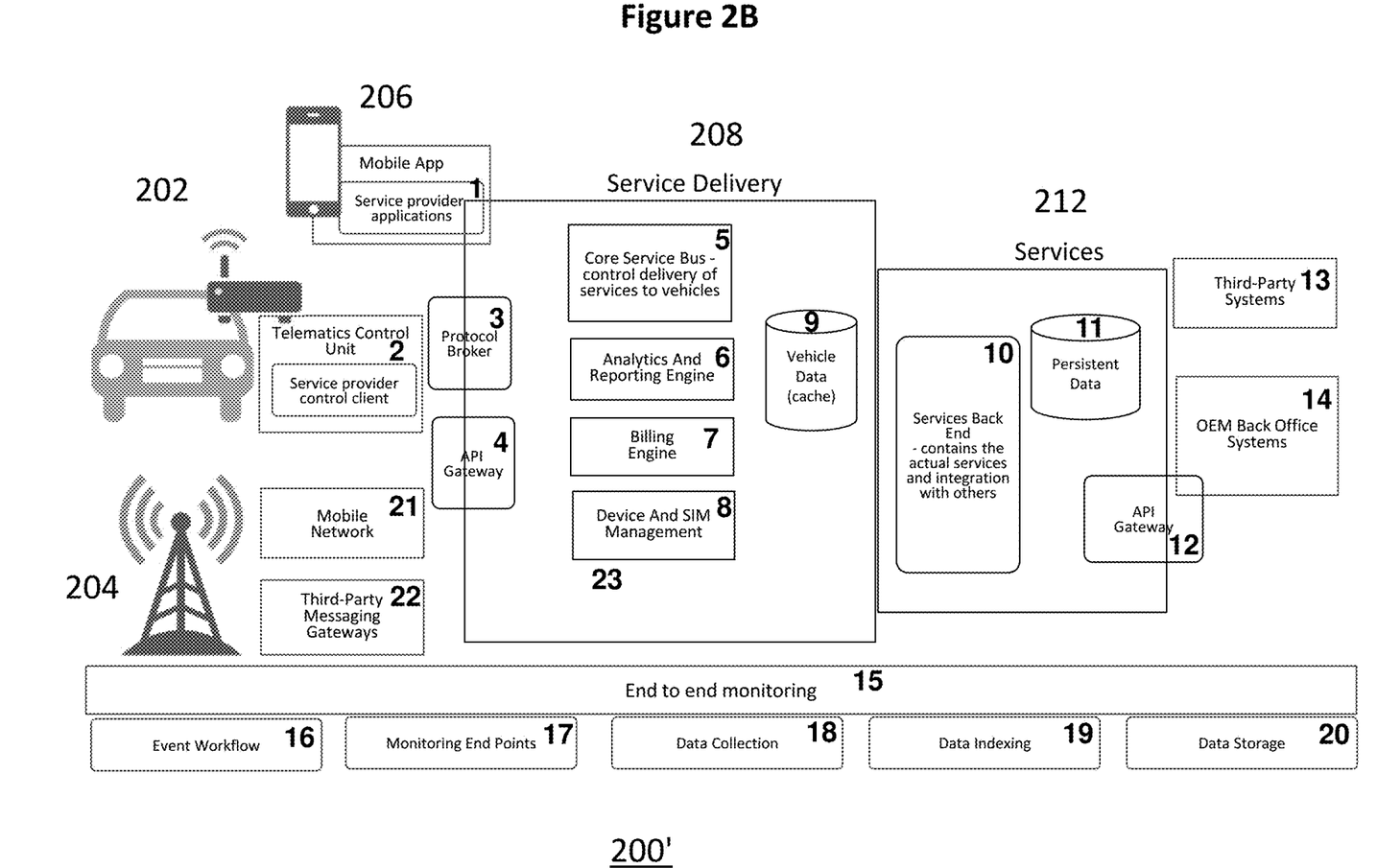
FIG. 2B illustrates a block diagram 200' of a system used in the connected vehicle enrollment method in accordance with one or more embodiments of the present invention.

FIG. 2B illustrates a block diagram 200' of a system used in the connected vehicle enrollment method in accordance with one or more embodiments of the present invention. The interactive interface described in the description accompanying FIG. 2A may be a portal provided by original equipment manufacturer (OEM) and may be used to complete enrollment process and to manage vehicle owner accounts. The interactive interface may include any one or more of a mobile application 1 or a telematics control unit 2, also known as a service provider control client, in communication with a service delivery system 208.

Where the customer agrees to the agreement term referenced above, the customer and vehicle information may be provided via the interactive interface or interactive interface engine to a registration engine.

The registration engine compares the information obtained from the purchase agreement with one or more databases including vehicle data (cache) 9 and persistent data 11, for registry verification. The comparison performed by the registration engine, in one embodiment, compares the VIN number of the purchased vehicle of the transaction with the VIN number of the automotive database, also known as vehicle data (cache) 9, to ensure that the purchased vehicle is available for purchase by the customer and may be registered in accordance with the method of the invention. If the registration engine determines that the VIN number of the customer vehicle under the purchase agreement is available for purchase by the customer and may be registered, the verification process is successful. If the registration engine determines that the VIN number of the customer vehicle under the purchase agreement is not available for purchase by the customer and may not be registered, the verification process is unsuccessful, returning a failure notice to the sales associate or similar dealer related entity. There are envisioned a number of reasons for possible failure including typographical errors in the sales agreement, inaccurate information in the RDR, pre-sold vehicle not properly accounted for by dealer, etc.

Similarly, the registration engine (also known as a communications and verification engine) may also consult other databases to determine the availability of a vehicle for registration. Other examples of possible databases, in accordance with one or more embodiments of the present invention, include geolocation databases, dealer inventory databases, public databases, private databases. By further example, the registration engine may compare the geolocation of the vehicle to be registered with the geolocation of vehicle data from a database, e.g., vehicle data (cache) 9 and persistent data 11, apart having a secondary VIN-based dataset from the dealership to verify vehicle availability, to determine accuracy of dealership database, and to protect the customer from possible fraud such as VIN swapping, for instance.

Once the verification of a successful registration is achieved, specific data may be passed to the vehicle to be registered by a registration event. In accordance with one or more embodiments of the present invention, vehicle and customer data is provided to the vehicle's communication system. The vehicle communication system may include cellular and/or Wi-Fi enabling communication protocols to enable receipt and transmission of messages to and from an authorized server, local link, and/or remote communication system, such as the registration engine or the confirmation engine, for example, to verify the accuracy of the inputted information, the desired subscription services may be upload, initiated and/or registered.

Once the in-vehicle 'welcome' message is received, the customer then responds to the message and inputs a response. The customer's inputted response, in an embodiment, indicates acceptance of the terms of using the system, indicates that the vehicle is now registered or will be delivered as intended to the customer, and then sends the inputted response to an authorized server for verification. The transmitted response is then verified by comparing the received input information with that known in one or more databases which are networked elements of the present invention.

In the event the inputted response is accurate, the authorized server such as the confirmation engine (also known as an enrollment engine), returns a confirmation successful notice to one or more of the sales department, the customer, the customer's email or smart phone, and the vehicle's communication system. In the event there is an error in the inputted information, or the authorized server is unable to validate the inputted response, a notice of the unsuccessful attempt is sent to one or more of the sales department, the customer and the vehicle's communication system.

Upon successful confirmation by the confirmation engine, the vehicle is then readied for activation of the subscription services. The subscription services may be one of a variety of levels of subscriptions services, may be individualized services, or may be standard services which are default services. The subscription services may also be selectable individually by the customer or dealer via the interactive interface though the approach by the present invention is have the subscription services pre-selected for activation so activation of the pre-selected services may be essentially automatic following registration and verification steps.

Once the confirmation engine has affirmed the validity of the inputted response, the subscription services are then activated at in accordance with the level of services chosen during the pre-select. Similarly, the services can also be amended, changed or updated at anytime using the present invention as well. The level of services may include a full activation set which reflects the suite of services selected during a pre-select, for instance; a limited set of services which may be limited to only safety and security services, for instance; and a secondary owner or transfer vehicle 202 in which the existing data on the vehicle's communication system is wiped clean and then updated with the status of the vehicle. In the latter situation, it is envisioned by the present invention that the transfer vehicle may be a 'trade-in' vehicle to a dealership for example and have no immediate purchaser in which services may or may be uploaded based upon ownership and title issues; similarly, in the event of a subsequent owner of a vehicle, the prior owner's data is wiped clean and then subscription services in accordance with the new owner are updated and activated. In further scenario, it is possible that RDR is delayed where the registration can be verified but the subscription services cannot be fully activated; in such a scenario the present invention provides for registering the vehicle, enabling a limited set of subscription functions and sending a notification to one or more the customer, the dealer and the automotive manufacturer concerning the delayed RDR.

In one or more embodiments, the registration engine passes information via the registration event to the vehicle where the information includes successful verification for registration of the vehicle, customer name, customer email, customer cell phone, vehicle VIN number, and desired subscription services to the vehicle. Once received by the vehicle's communication system, the vehicle's communication system generates a 'welcome' message for use by the customer and/or dealer.

The 'welcome' message is generated in response to the data received by the vehicle's communication system and in accordance with a predetermined format suitable for the dealer, automotive manufacturer, marketing intermediary, leasing company, or other authorized user who has authority to predetermine the format of the messaging. Preferably, the 'welcome' message is generated for visual and/or audio access within the vehicle, as an in-car message which may be displayed in a center console, screen, interactive display platform, or connected customer device such as a smart phone, for instance.

The registration engine described in the description accompanying FIGS. 1 and 2A may include many components used in conjunction to determine which person(s) have access to what vehicle(s) and which services, e.g., exact services or a group of services. As described in the description accompanying FIGS. 1 and 2A, a remote server may act as a registration (pre-registration) engine and/or authentication (post-registration) engine that verifies registration qualification of the registered vehicle by the user, which may be a registered user. In an embodiment, the registration engine and the authentication engine may be the same or different.

Once the registration qualification is successfully verified, the customer is able to undertake specific actions related to the ownership of their vehicle(s). If the owner is not registered and/or authenticated, a fail message is returned to the user. The components of registration and/or authentication engine along with the remote server described above may include any of a mobile application 1 or a telematics control unit 2, also known as a control client, in communication with a service delivery system 208 including a protocol broker 3 and API gateway 4 communicatively coupled to core service bus 5 which in turn is connected to analytics and reporting engine 6, billing engine 7 and vehicle data (cache) 9. The registration and/or authentication engine may periodically re-credential the vehicle owner to check if the account information stored in the system is accurate.

Once the verification of a successful comparison is achieved via registration and/or authentication engine, the customer is able to undertake specific actions related to the ownership of their vehicle(s). If the owner is not registered/authenticated, a fail message is returned to the user may be passed to the vehicle to be registered by a registration event. After being registered/authenticated, the customer is able to manage their linked account remotely through the interactive interface. For example, when a service request comes into back end systems, like a "remote door unlock", the system checks if there is an active account associated with the vehicle or a record of being sold via a retail delivery report (RDR) and the services associated with that account. If the service package associated with the account includes "remote door unlock", only then the service request will be granted. This requires authentication which may be obtained only after the vehicle is enrolled with the system via registration. The customer may then also choose to request to manage the linked account and then more specifically identify that as part of the account management if it is desired to remove a registered vehicle from the account due to an ownership change.

Where the customer in future decides to elect to transfer the vehicle or delete the vehicle, a reaffirming confirmation is requested from the communication system to ensure the decision of the customer is correct. Where the customer reaffirms the action, then the communication system updates the associated databases, for example, vehicle data 9, as to removing ownership associated with the vehicle from the dealer, if there is any, assigns new ownership of the vehicle to the customer (e.g., purchaser), and updates VIN databases to reflect ownership and customer information associated with ownership. A notification is sent to the customer of the actions undertaken, and a notification is sent to vehicle information database of the ownership of the vehicle. (The subsequent owner enrollment process is described in detail in the related to U.S. patent application Ser. No. 16/531,323, filed on Aug. 5, 2019, which is a continuation of U.S. patent application Ser. No. 15/895,152, filed Feb. 13, 2018, which is a continuation-in-part of U.S. patent application Ser. No. 14/927,285, filed on Oct. 29, 2015, entitled "AUTOMATIC CONNECTED VEHICLE SUBSEQUENT OWNER ENROLLMENT PROCESS".)

The core service bus 5 controls the delivery of services to vehicles based on registration as well as authentication and authorization of vehicles by interacting with services 212 which may include services backend 10, persistent data 11, API gateway 12 in communication with OEM back office systems 14 and/or third party systems 13 providing services and a mobile network 21 used for communication. In accordance with one or more embodiments of the present invention, vehicle, dealer, marketing and/or customer data may be provided to the vehicle's communication system. The vehicle communication system may include cellular and/or Wi-Fi (satellite and/or other wireless communications and/or combination of several wireless technologies) enabling communication protocols to enable receipt and transmission of messages to and from an authorized server, local link, and/or remote communication system, such as the registration and/or authentication engine. In one or more embodiments, once authentication is granted via registration process, the owner may activate subscription services and access to the vehicle for use including generating a 'welcome' message for the visual display within the vehicle. The welcome message can be personalized via automated processes.

The computer based secure communication may include a combination of software and vehicle hardware, mobile application, mobile network access and management as well as monitoring, and reporting functions. The computer based secure communication system may provide communication between a telematics control unit 2, also known as a control client, in communication with a service delivery system 208 including a protocol broker 3 and API gateway 4 which are communicatively coupled to device and SIM management 8 and vehicle data 9 cache. The service delivery system 208 in connected to services including persistent data 11, API gateway 12 in communication with OEM back office systems 14 and/or third party systems 13, a mobile network 21 used for communication, third party messaging gateway 22 and connectivity management 23.

In one or more embodiments, reporting from the system of the present invention may include reports of data identifying vehicles sold, subscription services selected and enabled, success and failure rates of activation and registration, timing and time score associated with sales deliveries, location, wireless network access, services usage, etc. The reporting engine may include components that track usage across applications in the vehicle, on the wireless network, on the services delivery platform, and other $3^{rd}$ party systems, and may include components such as end to end monitoring 15, event workflow 16, monitoring endpoints 17, data collection 18, data indexing 19 and data storage 20 in addition to the components described above.

For example, once the enrollment process is complete, any one or more of the end to end monitoring 15, event workflow 16, monitoring endpoints 17, data collection 18, data indexing 19 and data storage 20 may be used to periodically monitor the vehicle, develop a pattern of "normal" behavior that may include location, wireless network access, services usage, etc. Using such monitoring a usage pattern may be developed within the first few months of vehicle ownership. When an abnormality in the learned pattern is noticed, the situation may be analyzed to find the reasons for such abnormality. If the abnormality detected is categorized as one of very high importance like extreme data usage, the system may block access to services and networks for that vehicle.

Figure 3:
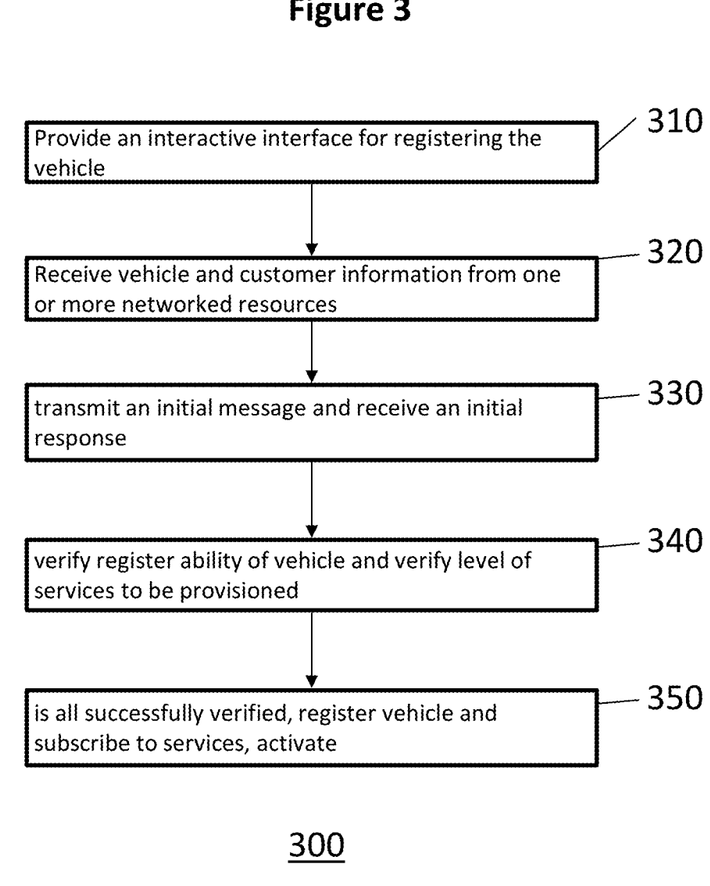
FIG. 3 illustrates a process of an embodiment of the present invention in which services are activated in response to registration and verification events using the present invention.

FIG. 3 illustrates a process 300 of an embodiment of the present invention in which services are activated in response to registration and verification events using the present invention.

FIG. 3 depicts a process for using a computer implemented method for on-boarding a vehicle via a vehicle registration network. The method in accordance with one or more embodiments of the present invention includes providing an interactive interface for registering the vehicle at 310, and receiving vehicle and customer information from one or more networked resources at 320. At 310, the interactive interface is preferably an interactive display with touch screen capabilities associated with eh vehicle to be registered. At 320, preferably networked resources include database and dataset information related to customer detail and information, vehicle details and information, and dealership and/or point of sale (POS) information.

From FIG. 3, an initial welcome message is transmitted to the vehicle to be registered at 330. The message is transmitted across a secure communication system which permits communications between the vehicle communication system and the data servers registering and authentication the vehicle for the transaction. The computer based secure communication is described in detail in the description accompanying FIGS. 2A and 2B. At 340, the customer response to the inquiry message is compared with known datasets in the networked elements and resources, and if successfully verified the vehicle is registered and the subscription services may be provisioned in accordance with the level of service designated for the customer and vehicle. Accordingly, once all data is verified through the verification processes, the vehicle is registered and the subscriptions are activated at 350. The verification processes may be carried out by an authentication engine or the verification engine. The authentication engine is described in detail in the description accompanying FIGS. 1, 2A and 2B. Where, beneficially, the customer is able to take immediate possession of the vehicle at the POS from the sales associate and have a vehicle which is fully-enabled with the desired subscription service set sought.

Figure 4:
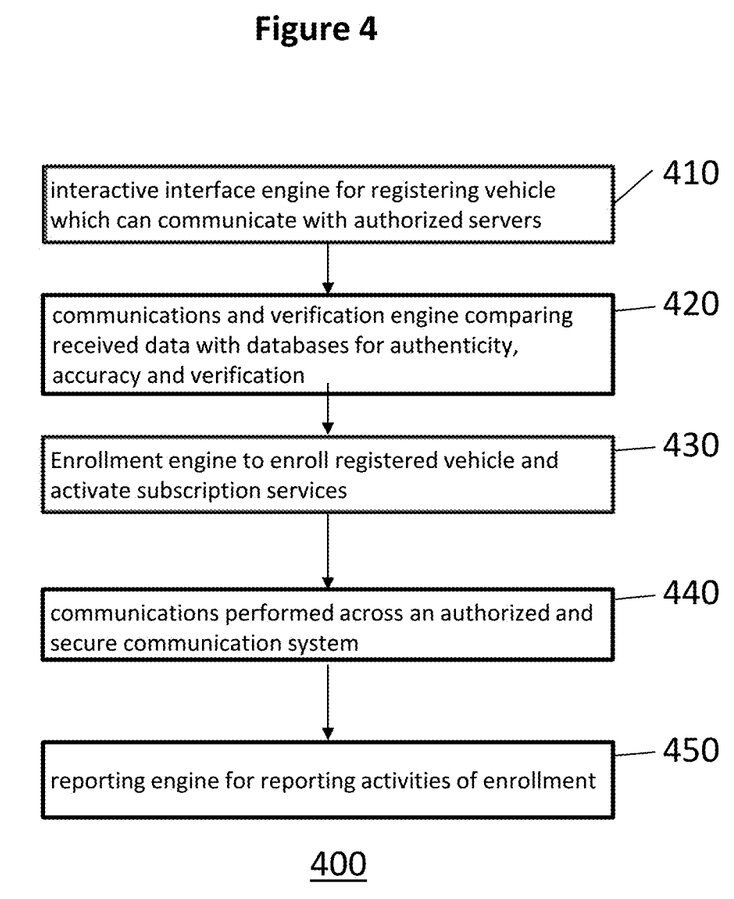
FIG. 4 illustrates a further process of an embodiment of the present invention in which services are activated using an interactive interface engine, a communications and verification engine, an enrollment engine and a reporting engine, in response to registration and verification events using the present invention.

FIG. 4 illustrates a further process 400 of an embodiment of the present invention in which services are activated using an interactive interface engine, a communications and verification engine, an enrollment engine and a reporting engine, in response to registration and verification events using the present invention. The interactive interface engine, also known as interactive interface, is described in detail in the description accompanying FIGS. 1, 2A and 2B.

From FIG. 4, a system for use in an automotive sales network for enrolling a vehicle to one or more subscription-based events is set forth. At 410, an interactive interface engine providing an interactive interface for registering the vehicle and which is capable of receiving and transmitting messages is set forth. At 420, a communications and verification engine for receiving vehicle and customer information from one or more networked databases and comparing data obtained in the received and transmitted messages with the received vehicle and customer information is set forth. At 430, an enrollment engine for enrolling the vehicle as a registered vehicle capable of having one or more activated subscription-based events and an activation engine for activating one or more subscription-based events in association with a level of service to be activated for the vehicle when registered, are provided. At 440, a computer-based secure communication system capable of communications with the one or more networked databases, the vehicle and a sales center, wherein the secure communication is further capable of transmitting and receiving messages to and from the vehicle wirelessly, is presented. At 450, a reporting engine for generating one or more reports in response to data from one or more of the enrollment engine and the activation engine is set forth.

Preferably, in one or more embodiments, reporting from the system of the present invention will include reports of data identifying vehicles sold, subscription services selected and enabled, success and failure rates of activation and registration, timing and time score associated with sales deliveries, etc.

Figure 5:
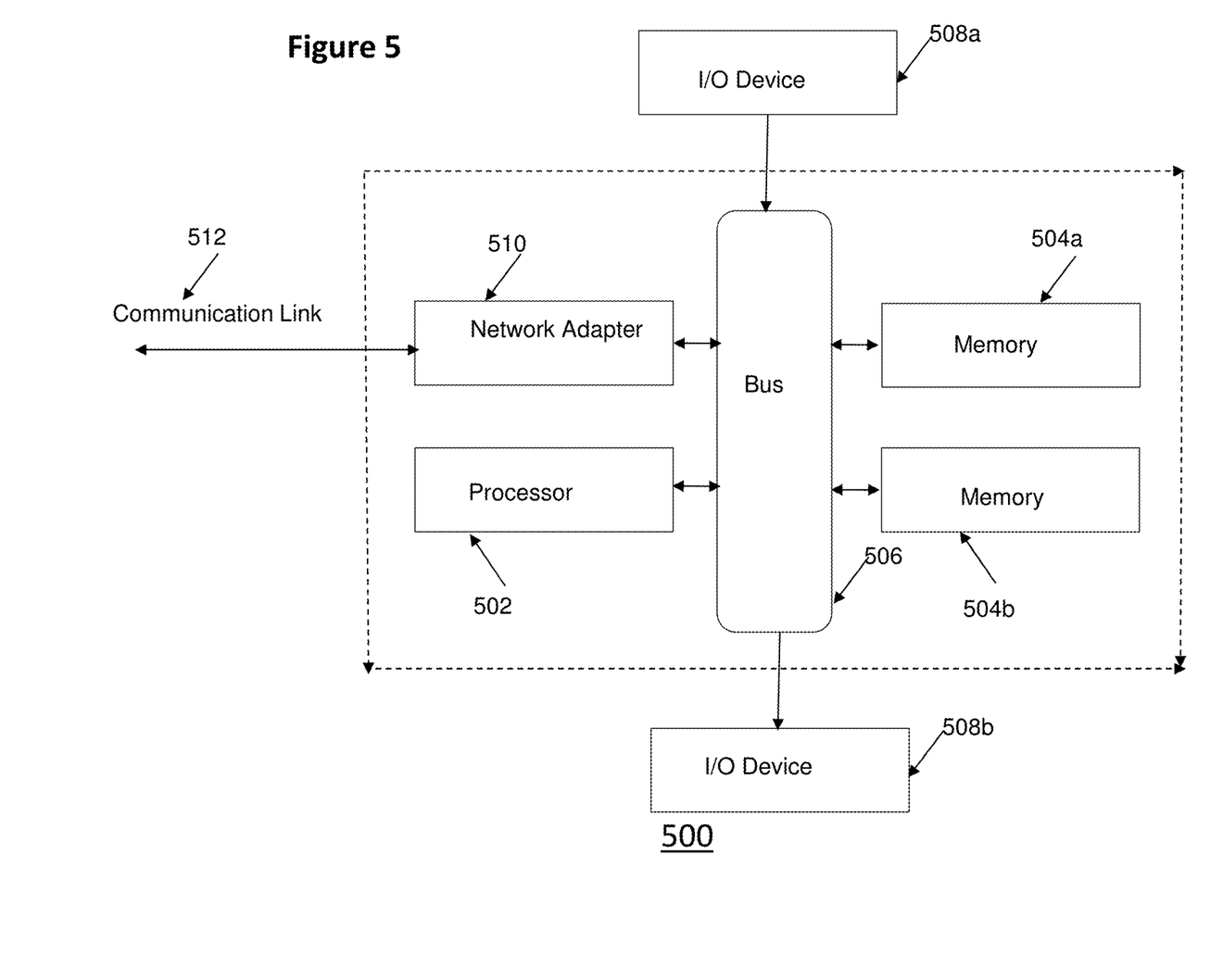
FIG. 5 illustrates a data processing system suitable for storing the computer program product and/or executing program code in accordance with an embodiment of the present invention.

FIG. 5 illustrates a data processing system 500 suitable for storing the computer program product and/or executing program code in accordance with an embodiment of the present invention. The data processing system 500 includes a processor 502 coupled to memory elements 504a-b through a system bus 506. In other embodiments, the data processing system 500 may include more than one processor and each processor may be coupled directly or indirectly to one or more memory elements through a system bus.

Memory elements 504a-b can include local memory employed during actual execution of the program code, bulk storage, and cache memories that provide temporary storage of at least some program code in order to reduce the number of times the code must be retrieved from bulk storage during execution. As shown, input/output or I/O devices 508a-b (including, but not limited to, keyboards, displays, pointing devices, etc.) are coupled to the data processing system 500. I/O devices 508a-b may be coupled to the data processing system 500 directly or indirectly through intervening I/O controllers (not shown).

In FIG. 5, a network adapter 510 is coupled to the data processing system 502 to enable data processing system 502 to become coupled to other data processing systems or remote printers or storage devices through communication link 512. Communication link 512 can be a private or public network. Modems, cable modems, and Ethernet cards are just a few of the currently available types of network adapters.

As used herein the term subscription-based services may include any vehicle service or customer service such as those associated with telematics, safety and security, remote services, navigation, performance, geolocation and geopositional, diagnostics, convenience applications, general information, utilization of publicly accessible data and electronic databases, etc. The term subscription-based is not intended to imply a for-fee service is required, rather the term is specific to indicate that customer must subscribe to the particular service through an activation or registration event associated with the vehicle; once the customer subscribes to the service, the service is then available to the customer through the vehicle.

Other exemplary services which are intended to be part of the present invention as being subscription services available include but are not limited to: (1) Safety and Security services including ACNDirect, SOS, Vehicle Finder; (2) Remote Services including door lock/unlock, engine start, horn honk, flash lights, trunk open, cabin pre-conditioning, geofencing and speed alerts, window control; (3) Performance Services including: performance report, vehicle snapshot, remote vehicle information; OTA updates and upgrades; (4) Navigation Services including: maps, map updates, real-time traffic, speed cam warnings, POI search, parking spots; (5) Infotainment Services including: cloud-based applications, streaming music, streaming video, internet browsing, news, stocks, sport scores, concierge, movie listings, flight info, calendar, weather forecast.

While the present invention has set forth sequences and/or steps involved in one or more embodiments of the present invention, the present invention is not so limited as to require the sequences set forth to be required to perform the present invention; the present invention may be adapted and enabled using the sequences and/or steps in varied configurations and order, whereas the present invention will remain operational as intended and perform successfully.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims. Many other embodiments of the present invention are also envisioned.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

Similarly, it is envisioned by the present invention that the term communications and network includes communications across a network using one or more communication architectures, methods, and networks, including but not limited to: Code division multiple access (CDMA), Global System for Mobile Communications (GSM) ("GSM" is a trademark of the GSM Association), Universal Mobile Telecommunications System (UMTS), Long Term Evolution (LTE), 4G LTE, wireless local area network (WIFI), and one or more wired networks.

Accordingly, a system and method in accordance with one or more embodiments presented above overcomes the challenges of existing practices and provides a more robust and convenient approach to better enroll customers with their vehicle via an authentication-based process while overcoming the traditional security, financial and logistical challenges.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W),

What is claimed is:

1. A computer implemented method for on-boarding a vehicle via a vehicle registration network; the method comprising:
   providing an interactive interface on display of the vehicle for registering the vehicle;
   receiving vehicle information dataset including vehicle identification number (VIN) and geolocation of the vehicle and customer information dataset from one or more networked resources;
   verifying availability of the vehicle for registration based on vehicle identification number (VIN) and geolocation of the vehicle by comparing geolocation of the vehicle to be registered in the vehicle information dataset with geolocation of the vehicle from a database having a vehicle identification number (VIN)-based dataset from a dealership;
   transmitting an initial message to the interactive interface on the display of the available vehicle to be registered;
   receiving an initial response from the interactive interface on the display of the available vehicle to the initial message;
   verifying accuracy of the received initial response with an authorized server to complete registration;
   verifying a level of services to be activated for the vehicle when registered; and
   activating the verified level of services for the registered vehicle.

2. The method of claim 1, wherein verifying availability of the vehicle to be registered includes comparing at least the initial response with at least one characteristic of the vehicle and customer information.

3. The method of claim 2, wherein the interactive interface includes one or more of an in-vehicle computer touch screen, an application for a smart phone having an input capability, a shared messaging service, a web page, a web-based hyperlink, and an email requiring a response.

4. The method of claim 3, wherein the one or more networked resources includes at least one data source having vehicle information or customer information accessible by the vehicle registration network.

5. The method of claim 4, wherein the vehicle information includes one or more of a retail delivery report (RDR), registered vehicles data, registered vehicle owners data, registered vehicle credential identification data, registered vehicle security data, vehicle identification number (VIN) data, title information, insurance information, ownership information, past history information, subscription information, vehicle geolocation information, publicly available information, and private sourced information.

6. The method of claim 5, wherein the subscription information includes data from one or more commercial databases including Polk, IHS and Nielsen.

7. The method of claim 4, wherein the customer information include one or more of customer identification information, customer purchasing history, customer ownership information, customer geolocation information, customer subscription information, customer account data, customer contact information, customer marketing information, publicly available information about the customer and private sourced information about the customer.

8. The method of claim 7, wherein the customer marketing information includes web history associated with vehicle manufacturer, prior contacts with vehicle manufacturer and distributor, incentive and rebate utilization, responses to targeted marketing regarding vehicle, email address(es), and registered applications utilized by customer.

9. The method of claim 4, wherein the initial message is a welcome message transmitted wirelessly from the network to a receiving device activating the interactive interface for registering the vehicle, wherein the receiving device includes one or more of a vehicle, smart phone, computer, shared messaging service, email or computer-based tool capable of activating a software-based application.

10. The method of claim 9, wherein the initial response is an input entered in response to the initial message.

11. The method of claim 10, wherein the input entered is a customer's email provided in response to the welcome message asking for the customer's email.

12. The method of claim 10, wherein comparing at least the initial response with at least one characteristic of the vehicle and customer information includes comparing the customer email input with the customer identification information to verify that the customer registering the vehicle is the owner of the vehicle.

13. The method of claim 12, wherein verifying availability of the vehicle to be registered is successfully determined where compared input with the vehicle and customer information is verified to be authentic and properly associated for registration; and the availability of the vehicle to be registered is unsuccessfully determined where compared input with the vehicle and customer information is verified to not be properly associated for registration.

14. The method of claim 13, wherein the level of services to be activated for the registered vehicle is determined in relation to ownership of the vehicle, and wherein the level of services to be activated for the registered vehicle are activated.

15. A non-transitory computer-readable medium storing executable instructions for enrolling a vehicle to one or more subscription-based events, which when executed cause a computer to perform operations comprising:
   providing an interactive interface on display of a vehicle for registering the vehicle,
   receiving vehicle information dataset including vehicle identification number (VIN) and geolocation of the vehicle and customer information dataset from one or more networked resources;
   verifying availability of the vehicle to be registered based on vehicle identification number (VIN) and geolocation of the vehicle by comparing geolocation of the vehicle to be registered in the vehicle information dataset with geolocation of the vehicle from a database having a vehicle identification number (VIN)-based dataset from a dealership;
   transmitting an initial message to the interactive interface on the display of the available vehicle to be registered;
   receiving an initial response from the interactive interface on the display of the available vehicle to the initial message;
   verifying accuracy of the received initial response with an authorized server to complete registration of the vehicle;

verifying a level of services to be activated for the vehicle when registered; and activating the verified level of services for the registered vehicle.

16. The computer-readable medium of claim 15, wherein the interactive interface includes one or more of an in-vehicle computer touch screen, an application for a smart phone having an input capability, a shared messaging service, a web page, a web-based hyperlink, and an email requiring a response, and wherein the one or more networked resources includes at least one data source having vehicle information or customer information accessible by the vehicle registration network.

17. The computer-readable medium of claim 16, wherein the level of services are tiered offering of subscription services.

18. The computer-readable medium of claim 15, wherein the interactive interface resides on a device which comprises any type of computer-based device, appliance, terminal, remote controlling device, vehicle, or wireless asset.

19. A system for use in an automotive sales network for enrolling a vehicle to one or more subscription-based events, comprising:
   an interactive interface engine providing an interactive interface on a display of the vehicle for registering the vehicle and which is capable of receiving and transmitting messages;
   a communications and verification engine for receiving vehicle dataset including vehicle identification number (VIN) and geolocation of the vehicle and customer information dataset from one or more networked resources;
   verifying availability of the vehicle for registration based on vehicle identification number (VIN) and geolocation of the vehicle by comparing geolocation of the vehicle to be registered in the vehicle information dataset with geolocation of the vehicle from a database having a vehicle identification number (VIN)-based dataset from a dealership;
   a computer-based secure communication system capable of communications with the one or more networked databases, the vehicle and a sales center, wherein the secure communication is further capable of transmitting and receiving messages to and from the vehicle wirelessly, wherein an initial message is transmitted to the interactive interface on the display of the available vehicle to be registered and an initial response is received from the interactive interface on the display of the available vehicle to the initial message;
   an authorized server for verifying accuracy of the received initial response to complete registration of the vehicle to complete registration of the vehicle;
   an enrollment engine for enrolling the vehicle as a registered vehicle capable of having one or more activated subscription-based events;
   an activation engine for activating one or more subscription-based events in association with a verified level of service to be activated for the vehicle when registered; and
   a reporting engine for generating one or more reports in response to data from one or more of the enrollment engine and the activation engine.

20. The system of claim 19, wherein the subscription-based events include one or more of a for-fee application, for-free application, music service, emergency service, safety and notification service, diagnostic service, reporting service, maintenance service, in-car application, mobile application, and remote application.

* * * * *